United States Patent [19]

Roozenbeek et al.

[11] E Re. 29,862

[45] Reissued Dec. 19, 1978

[54] IGNITION SYSTEM DEPENDENT UPON ENGINE SPEED

[75] Inventors: Herman Roozenbeek, Schwieberdingen; Bernd Bodig, Leinfelden; Klaus Meyer, Daverden; Adolf Fritz, Suttgart, all of Fed. Rep. of Germany

[73] Assignee: Robert Bosch GmbH, Stuttgart, Fed. Rep. of Germany

[21] Appl. No.: 793,953

[22] Filed: May 5, 1977

Related U.S. Patent Documents

Reissue of:

[64] Patent No.: 3,881,458
Issued: May 6, 1975
Appl. No.: 396,517
Filed: Sep. 12, 1973

[30] Foreign Application Priority Data

Sep. 13, 1972 [DE] Fed. Rep. of Germany ..... 2244781

[51] Int. Cl.[2] ..... F02P 1/00; F02P 5/06

[52] U.S. Cl. ..... 123/148 E; 123/117 R; 123/146.5 A

[58] Field of Search ..... 123/117 R, 148 E, 32 EA

[56] References Cited

U.S. PATENT DOCUMENTS

| | | | |
|---|---|---|---|
| 3,087,001 | 4/1963 | Short et al. | 123/148 E |
| 3,291,108 | 12/1966 | Schneider et al. | 123/148 E |
| 3,361,123 | 1/1968 | Kasama et al. | 123/148 E |
| 3,581,725 | 6/1971 | Hemphill | 123/148 E |
| 3,587,551 | 6/1971 | Harrow | 123/148 E |
| 3,605,713 | 9/1971 | Masters et al. | 123/148 E |
| 3,620,196 | 11/1971 | Wessel | 123/148 E |
| 3,640,260 | 2/1972 | Mittag et al. | 123/148 E |
| 3,745,985 | 7/1973 | Höhne | 123/148 E |
| 3,791,364 | 2/1974 | Saita et al. | 123/148 E |
| 3,898,972 | 8/1975 | Haubner | 123/117 R |
| 3,926,557 | 12/1975 | Callies et al. | 123/148 E |
| 4,008,698 | 2/1977 | Gartner | 123/117 R |

*Primary Examiner*—Charles J. Myhre
*Assistant Examiner*—Parsham S. Lall
*Attorney, Agent, or Firm*—Michael J. Striker

[57] ABSTRACT

An internal combustion engine is comprised of at least one engine cylinder, devices for introducing a combustion mixture into the cylinder, and an electrical igniting element operative for igniting the combustion mixture in the cylinder once per ignition cycle. An ignition transformer has a secondary winding connected across the igniting element, and also has a primary winding. A flow of current is established through the primary winding. An electronic switch is connected in the current path of the primary winding to control the flow of current through the primary winding. A triggering unit generates a train of crankshaft-synchronized triggering signals. A monostable control circuit has a trigger input for receipt of such triggering signals, and is operative when triggered into the unstable state for rendering and maintaining the electronic switch nonconductive for the duration of the unstable state, so as to interrupt the flow of current through the primary winding and induce across the secondary winding a voltage surge causing the igniting element to ignite the combustion mixture in the engine cylinder. When the monostable control circuit reverts to its stable state, it renders and maintains the electronic switch conductive for the duration of the stable state, whereby to establish a build-up of current flow in the primary winding in preparation for the next interruption of current flow. The monostable control circuit includes a timing stage operative for automatically [increasing] *decreasing* the ratio of the duration of the unstable state to the duration of the ignition cycle with increasing engine speed within a predetermined range of engine speeds.

28 Claims, 5 Drawing Figures

IGNITION SYSTEM DEPENDENT UPON ENGINE SPEED

Matter enclosed in heavy brackets [ ] appears in the original patent but forms no part of this reissue specification; matter printed in italics indicates the additions made by reissue.

BACKGROUND OF THE INVENTION

The invention relates to ignition arrangements for internal combustion engines of the type which operate contact-free, i.e., without the use of mechanical synchronizing switches.

More particularly, the invention relates to ignition arrangements comprised of an electrical fuel-igniting element, such as a spark plug or other equivalent component, connected across the secondary winding of an ignition transformer, with the flow of current through the primary winding of the ignition transformer being alternately permitted to build up and then interrupted, in order to induce voltage surges across the transformer secondary and cause the fuel-ignition element to ignite the combustion mixture in the engine cylinder.

It is known to provide an ignition system of this kind wherein the synchronization of the ignition moment with crankshaft rotation is accomplished by resorting to mechanical switches which are opened and closed in synchronism with crankshaft rotation.

It is also known to provide such systems but without mechanical synchronizing switches, making use instead of inductive means for generating synchronizing signals.

It is known, for example, to make use of an A.C. generator which generates an A.C. voltage waveform. When the generated synchronizing voltage reaches a predetermined level, for instance zero, current flow through the primary of the ignition transformer is interrupted, to create the ignition spark. When the generated synchronizing voltage reaches another value, or else reaches zero again at the end of the same voltage half-cycle, the flow of current through the primary winding is re-established. In theory, therefore, both the times of current establishment and current interruption are crankshaft-synchronized. In practice, however, such synchronizing A.C. voltage generators exhibit speed-dependent performance variations which prevent this mode of operation from actually being achieved. In particular, as a result of rotor reactive effects, eddy current generation and the drawing of load current from the output winding of the synchronizing generator by the control circuitry connected thereto, the zero passage of the generated waveform becomes shifted in such a manner that the duration of 1 voltage half-cycle becomes greater than that of the other voltage half-cycle, and this difference in duration increases with increasing engine speed. As a result, control circuitry synchronized with such a synchronizing A.C. voltage generator, and operative for the purpose mentioned above, will permit current flow through the primary winding of the ignition transformer for a time period, per ignition cycle, which is shorter than the time period during which no current flows through the primary winding. Moreover, with increasing engine speed, the ratio of the conduction time of the primary winding to the non-conduction time of the primary winding decreases with increasing engine speed. As a result, at high engine speeds, the build-up of current flow in the primary winding of the ignition transformer does not proceed to an extent sufficient to produce a satisfactory ignition voltage when the flow of primary winding current is subsequently interrupted.

German Offenlegungsschrift No. 15 39 178 describes an ignition system dependent upon engine speed. In that system, current flow is established in the primary winding of the ignition transformer shortly prior to the ignition moment, and in an engine-speed-dependent manner, and the current is then interrupted at the ignition moment to induce the ignition voltage surge. This prior-art construction makes use of a specially configurated rotor adapted to produce a special output voltage waveshape. The disadvantage of this known construction lies in the fact that the rotor is of relatively complicated form and is accordingly rather expensive to produce. Likewise, the remainder of this prior-art system cannot be used unless a rotor having this special configuration is available. A still further disadvantage of this prior-art system is that the slope of the synchronizing voltage waveform at the region of the zero passage is quite small, the voltage waveform changing only slowly in this region. As a result, there is a substantial region centered about the voltage zero-passage where the voltage waveform has values not too different from each other. Consequently, the ignition can easily be triggered rather substantially in advance of or rather substantially after the synchronizing zero-passage of the synchronizing A.C. voltage waveform.

SUMMARY OF THE INVENTION

It is the general object of the present invention to provide an ignition system for an internal-combustion engine wherein the ignition operation is performed in a manner dependent upon engine speed.

It is a more particular object to provide an ignition system of this type which avoids to a great extent the disadvantages of the prior-art systems.

These objects, and others which will become more understandable from the following description of preferred embodiments, can be met, according to one disadvantageous concept of the invention, by providing an ignition system for an internal combustion engine comprised of at least one engine cylinder, means for introducing a combustion mixture into the cylinder, and an electrical igniting element operative for igniting the combustion mixture in the cylinder once per ignition cycle. The system includes an ignition transformer having a secondary winding connected across the igniting element and having a primary winding. Means is provided for establishing a flow of current through the primary winding and includes electronic switch means in the current path of the primary winding operative for controlling the flow of current through the primary winding. Crankshaft-synchronized triggering means generates a train of crankshaft-synchronized triggering signals. A monostable control means is connected to the electronic switch means and has a trigger input connected to the triggering means for receipt of the triggering signals. The monostable control means is operative, when triggered into the unstable state thereof, for rendering and maintaining the electronic switch means non-conductive for the duration of such unstable state, whereby to interrupt the flow of current through the primary winding and induce across the secondary winding a voltage surge causing the igniting element to ignite the combustion mixture. The monostable control means, when it reverts to its stable state, is operative for rendering and maintaining the electronic switch means conductive for the duration of said stable state, whereby to establish a build-up of current flow in the primary winding of the ignition transformer, in preparation for the next interruption of current flow. The monostable control means includes timing means operative for automatically [increasing] *decreasing* the ratio of the duration of the unstable state to the duration of the ignition cycle with increasing engine speed within a predetermined range of engine speeds.

A particular advantage of the disclosed arrangement resides in the fact that the synchronizing A.C. voltage generator can use a rotor of very simple construction, having for example triangular projections around its circumference. Furthermore, the disclosed arrangement can make use of any A.C. voltage generator that generates substantially identically shaped voltage half-cycles. Accordingly, the disclosed arrangement is not limited to use with one specially designed synchronizing voltage generator. A still further advantage of the disclosed arrangement is that at lower engine speeds the duration of current flow through the primary winding of the ignition transformer, relative to the total duration of the ignition cycle, will be kept relatively small, in order not to excessively load the engine battery. On the other hand, at high engine speeds, the duration of current flow through the primary winding of the ignition transformer, relative to the total duration of the ignition cycle, will be made relatively large, in order to assure that the ignition voltage which is generated is of a sufficiently high magnitude.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
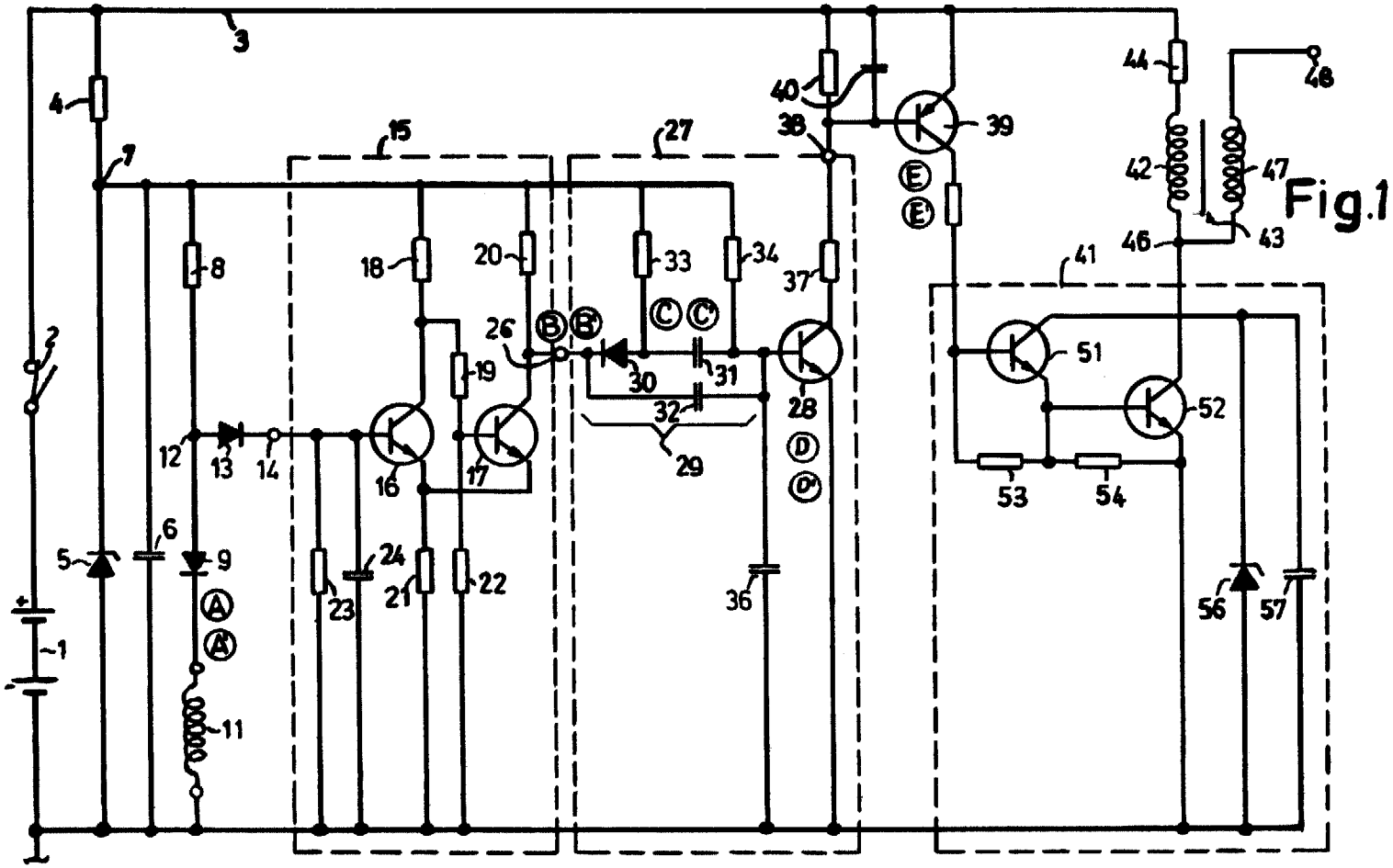
FIG. 1 depicts a circuit diagram of one embodiment of the invention.

In FIG. 1, reference numeral 1 designates a 12 volt battery having a positive terminal connected via an ignition switch 2 to a positive voltage supply line 3, with the negative battery terminal being connected to ground. Connected across the positive line 3 and ground is the series connection of a resistor 4 and a Zener diode 5, with a capacitor 6 being connected in parallel to the Zener diode 5. A stabilized voltage of 6.8 volts is available at circuit junction 7. An inductive generator of synchronizing signals, designated 11, is connected to circuit junction 7 by way of a resistor 8 and a diode 9. A diode 13 connected the circuit junction between resistor 8 and diode 9 to the input 14 of a threshold-detector stage 15, which may advantageously be in the form of a conventional Schmitt-trigger circuit.

The Schmitt trigger is comprised of transistors 16 and 17, as well as resistors 18, 19, 20, 21 and 22. The base of transistor 16 is connected to ground by the parallel combination of a resistor 23 and a capacitor 24. Capacitor 24 serves to stabilize the voltage across the base-emitter circuit of the transistor 16 against the influence of short-lasting interference signals. Connected to the output 26 of Schmitt trigger 15 is a control stage 27 comprised of a control transistor 28 and furthermore comprised of an energy-storing stage generally designated by numeral 29 and connected between the output 26 and the base of transistor 28. The energy-storing stage 29 is comprised of a diode 30, a capacitor 31, and a capacitor 32 connected in parallel to the series connection of diode 30 and capacitor 31. The capacitor 31 can be charged by current flowing from the stabilized circuit junction 7, through charging resistor 33, and can be discharged, by current flowing from the stabilized circuit junction 7, through discharging resistor 34. The control stage 27 additionally includes a base-emitter stabilizing capacitor 36 and a collector resistor 37 for the transistor 28.

The output 38 of the control stage 27 is connected to the base of an amplifying transistor 39. Connected across the base-emitter junction of transistor 39 is a parallel RC circuit 40. Amplifier transistor 39 controls the conductivity of an electronic switch 41 which is connected in the current path of the primary winding 42 of ignition transformer 43. The other end of primary winding 42 is connected, via a current-limiting resistor 44, to the positive voltage supply line 3. The secondary winding 47 of the transformer 43 has one terminal connected to the junction 46 between the primary winding 42 and the electronic switch 41. The other terminal of the secondary winding 47 constitutes the output terminal 48 of the ignition transformer 43 and is connected, for example, to an ignition distributor which applies the ignition voltage to successive spark plugs of the engine. The electronic switch 41 is comprised of two transistors 51 and 52 connected together in Darlington configuration, and furthermore includes resistors 53 and 54. The parallel combination of a Zener diode 56 and a capacitor 57 is provided to protect transistors 51 and 52 from excessive voltages.

The operation of the circuit shown in FIG. 1 will be described in detail below with reference to the waveforms depicted in FIGS. 2a and 2b. It is noted now, however, that the voltage divider comprised of resistor 8 and diode 9, the ohmic resistance of the output winding of the A.C. generator 11, the diode 13 and the resistor 23 are all assigned circuit values that the transistor 16 will be conductive, and therefore the transistor 17 non-conductive, when the speed of A.C. voltage generator 11 and accordingly its output voltage are zero. With transistor 17 non-conductive, the voltage at Schmitt trigger output 26 will be high, rendering diode 30 non-conductive. The transistor 28 will be maintained conductive because its base is connected to the 6.8 volt circuit junction 7 via resistor 34. Moreover, charging current can flow from circuit junction 7, through charging resistor 33 into the left-hand electrode of capacitor 31 and out of the right-hand electrode of capacitor 31, to ground, causing the development of a voltage drop across capacitor 31, the left-hand terminal thereof becoming positive with respect to the right-hand terminal thereof.

The relationship between the conductivities of transistors 28, 39, 51 and 52 should be kept clearly in mind, in order to understand the operation of the circuit of FIG. 1. When transistor 28 is conductive, transistors 39, 51 and 52 will likewise be conductive, thereby permitting current flow through primary winding 42 of ignition transformer 43. However, when transistor 28 becomes non-conductive, transistors 39, 51 and 52 will likewise become non-conductive, thereby the current flow through primary winding 42.

As soon as the rotor of the inductive signal generator 11 begins to turn, an A.C. voltage A (FIG. 2a) is generated, having substantially identically shaped half-cycles.

Figure 2A:
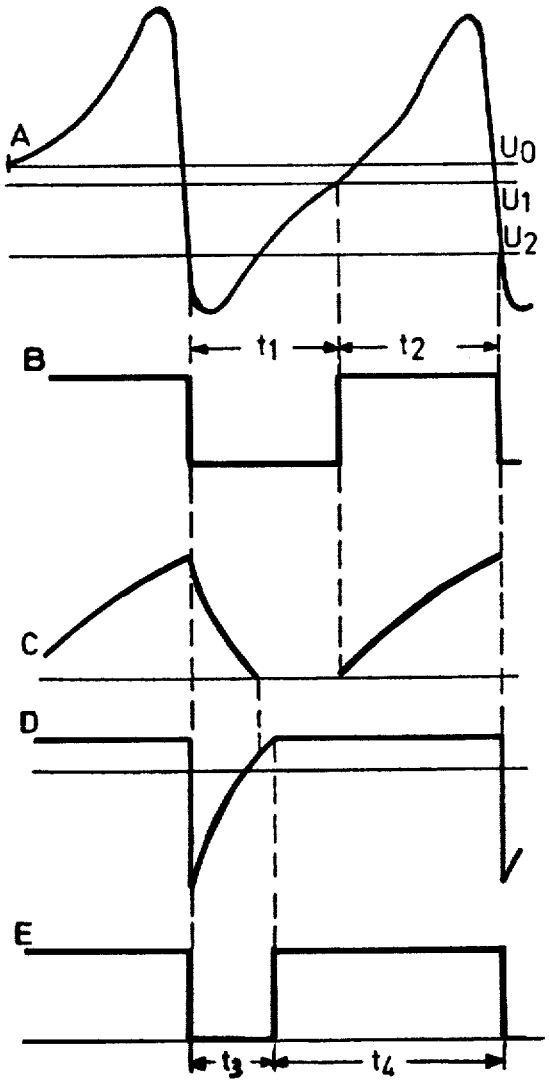
FIG. 2a depicts certain aspects of the operation of the circuit of FIG. 1, at a low engine speed.

At low rotor speeds, as shown in FIG. 2a, the time durations of the two half-cycles are approximately equal to each other. At higher rotor speeds, as shown in FIG. 2b, the time duration of the negative half-cycle becomes considerably greater than the time duration of the positive half-cycle. This is due to the fact that, in the illustrated control circuit, only the negative half-cycles are employed for control purposes. During positive half-cycles a positive voltage is induced, but no current is withdrawn from the output winding of the generator 11. However, during the negative half-cycles current is withdrawn from the output winding of the generator 11. The increase with rising engine speed of the duration of the negative half-cycles is due to rotor reactive effects, eddy current generation, etc. If an attempt were made to use these negative half-cycles to directly control the electronic switch 41 — i.e., the electronic switch which is connected in the current path of the ignition transformer primary winding 42 — then it is evident that with increasing engine speed the fraction of an ignition cycle for which the switch 41 would be conductive would decrease with increasing engine speed. This is not desirable.

Figure 2B:
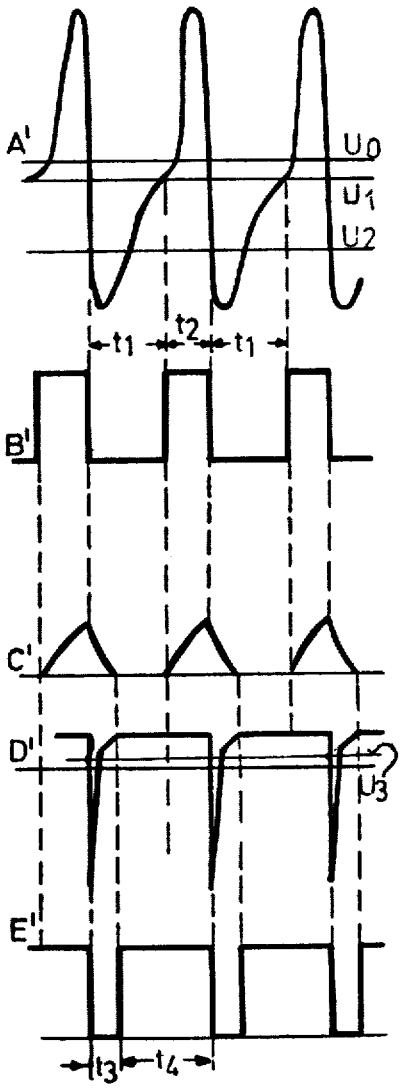
FIG. 2b depicts certain aspects of the operation of the circuit of FIG. 1, but at a high engine speed.

The rotor of the A.C. generator 11 is so shaped that the trailing portion of the positive half-cycle and the leading portion of the negative half-cycle of the voltage A have a very steep slope, as is evident from FIGS. 2a and 2b. Thus, the slope of the voltage waveform A is very steep in the region of the zero passage. Diode 9 (FIG. 1) passes only the negative half-cycle, which is applied to the input of threshold detector circuit 15. Diode 9 passes the positive half-cycle only during negligibly small fractions of the positive half-cycle occurring at the commencement and termination of the positive half-cycle. As mentioned before, the generator 11, during the positive half-cycle, is not loaded, and accordingly during this half-cycle rotor reactive effects, eddy-current generation and the like will not come significantly into play, resulting in much smaller shifts in the ignition moment than would otherwise be the case.

The threshold voltages of the Schmitt trigger 15 are designated $U_1$ and $U_2$ in FIGS. 2a and 2b. When the negative half-cycle of voltage waveform A or A' reaches the value $U_2$, the Schmitt trigger assumes its second state, in which the transistor 16 becomes non-conductive. When the same negative half-cycle subsequently assumes the value $U_1$, then transistor 16 becomes conductive again. Accordingly, transistor 17 is conductive during the time interval $t_1$, and non-conductive during the time interval $t_2$. The output voltage waveform at the output 26 of the Schmitt trigger 15 is designated B in FIG. 2a, corresponding to low engine speed, and is designated B' in FIG. 2b, corresponding to high engine speed.

By comparing the voltage waveforms and B and B', it will be evident that the ratio of the conductive time of transistor 17 to the non-conductive time thereof ($t_1/t_2$) increases with rising engine speed. If this output voltage were used to directly control the conductivity of electronic switch 41, then, as the engine speed increased, the fraction of an ignition cycle during which current flows through the primary 42 of ignition transformer 43 would decrease. This is undesirable, because at high engine speeds the current in primary winding 42 would not have time to build up to a value high enough to result in generation of a sufficiently high ignition voltage surge, when the current in the primary 42 is interrupted. In this embodiment of the present invention, the control stage 27 is provided to overcome this difficulty.

During the time $t_2$ that output transistor 17 of Schmitt trigger 15 is non-conductive, capacitor 31 charges up, via charging resistor 33, towards the 6.8 volts potential at circuit junction 7. The diode 30 isolates the capacitor 31 during the charging up of the latter, so that the driving voltage of the Schmitt trigger 15 will be uninfluenced by the voltage across the capacitor 31. Specifically, it is to be noted that during the time $t_2$, with the output transistor 17 of Schmitt trigger 15 non-conductive, the collector voltage thereof will be higher than the anode voltage of diode 30, so that diode 30 will be non-conductive. Accordingly, the current flowing from junction 7 through resistor 33 will pass only through the capacitor 31.

When the Schmitt trigger 15 returns to its original state, transistor 17 becomes conductive again, and remains so for the time interval $t_1$. When transistor 17 becomes conductive, its collector voltage falls below the anode voltage of diode 30, so that diode 30 becomes conductive. As a result charged-up capacitor 31 can discharge through the collector-emitter path of transistor 17 and then to ground through resistor 21. The charging up of capacitor 31 during the time $t_2$, and the subsequent discharging of capacitor 31 during the time $t_1$, is indicated by curve C in FIG. 2a, corresponding to low engine speed, and is indicated by curve C' in FIG. 2b, corresponding to high engine speed.

It is evident that the time intervals $t_1$ and $t_2$ will both decrease with increasing engine speed, although in different proportion, so that the ratio $t_1/t_2$ increases with increasing engine speed. Since capacitor 31 is charged up during the time period $t_2$, and then permitted to discharge during the time period $t_1$, it is apparent that the charge which will build up on the capacitor 31 during the time period $t_1$ will depend upon the duration of time period $t_1$, and will thereby depend upon engine speed. This is clear from a consideration of the difference between curve C in FIG. 2a and curve C' in FIG. 2b.

At the moment when transistor 17 becomes conductive, i.e., at the end of time period $t_2$, diode 30 becomes conductive, as just mentioned. The potential at the left-hand terminal of capacitor 31 is at that moment considerably more positive than the voltage at the right-hand terminal thereof. Accordingly, as the voltage at the left-hand terminal sinks rapidly towards ground when transistor 17 becomes conductive, the voltage at the right-hand terminal of capacitor 31 is dragged down to a negative value, inasmuch as the voltage across capacitor 31 cannot change instantaneously. As a result, a negative voltage is applied to the base of transistor 28, and transistor 28 becomes non-conductive.

The voltage which has built up across capacitor 31 by the time transistor 17 becomes conductive at the end of time period $t_2$ depends upon the duration of time period $t_2$. At lower engine speeds, the time period $t_2$ will be so long as to permit capacitor 31 to charge up to a relatively high voltage. Accordingly, when transistor 17 becomes conductive again at the end of period $t_2$, the negative voltage applied to the base of control transistor 28 will render the latter non-conductive in a very decisive manner. This is apparent from curve D in FIG. 2a, which depicts graphically the base-emitter voltage of transistor 28 at low engine speeds. It will be noted that at the end of the time period $t_2$ (or expressed otherwise, at the beginning of the time period $t_1$) the base voltage of transistor 28 will suddenly drop by an amount approximately equal to the voltage across capacitor 31 (curve C in FIG. 2a). Thereafter, the base voltage of transistor 28 (curve D, in FIG. 2a) will gradually rise towards zero and then towards a positive forward-bias value as the voltage across capacitor 31 decreases by corresponding amounts. At high engine speeds (see curve C', FIG. 2b) the voltage which has built up across capacitor 31 at the time transistor 17 becomes conductive again, may be too small to decisively render transistor 28 non-conductive. To avoid this difficulty, an additional capacitor 32 is provided. The capacitance of capacitor 32 is approximately 1/100 of the capacitance of capacitor 31.

By providing additional capacitor 32, the following occurs. When transistor 17 is rendered non-conductive, the capacitor 32 will be able to charge up towards the 6.8 volts voltage of circuit junction 7 through resistor 20. Moreover, capacitor 32 will charge up in this manner exceedingly rapidly, because of its very small capacitance value. The voltage build-up across capacitor 32 will be much faster than the voltage build-up across capacitor 31. Thus, at high engine speeds, whereas the voltage across capacitor 31 may have the time to build up to only a negligibly small value, the voltage across capacitor 32 will build up to a very substantial value. When, now, transistor 17 becomes conductive again, the voltage drop across capacitor 32, in the same manner as the voltage drop across capacitor 31 previously described, will be such as to apply a substantial negative voltage to the base of control capacitor 28. This negative turn-off voltage will be evident from curve D' of FIG. 2b, which shows the base-emitter voltage of transistor 28 at high engine speeds. It will be noted that the duration of this negative-going turn-off voltage spike is very short. This is because the low capacitance of capacitor 32, which results in the very quick charging up thereof, likewise results in the very quick discharging thereof. In fact, as can be seen from curve D' in FIG. 2b, capacitor 31 will still be discharging when capacitor 32 is already substantially completely discharged. Thus, provision of the combination of capacitors 31 and 32 assures that the transistor 28 will be rendered non-conductive in a dependable manner, at the end of the time period $t_2$, both in the range of low engine speeds and in the range of high engine speeds. It will be appreciated that when transistor 28 is rendered non-conductive, so also are transistors 39, 51, 52. Accordingly, at this moment, the flow of current through primary winding 42 of ignition transformer 43 is interrupted, causing generation of the ignition spark.

With the base-emitter voltage of transistor 28 controlled in the manner shown in curves D and D' in FIGS. 2a and 2b, the voltage applied to the input of electronic switch 41 will have the waveform indicated in curves E and E' of FIGS. 2a and 2b. During time period $t_3$ transistor 39 is non-conductive, and during time period $t_1$ transistor 39 is conductive. Accordingly, current will flow through the primary winding 42 during the time period $t_4$ and will not flow during the time period $t_3$.

A comparison of curves E and E' indicates that the fraction of the ignition cycle during which primary winding current flows is greater at higher speeds than at lower engine speeds. This is desirable, because it assures that the amount of energy permitted to build up in the magnetic field of ignition transformer 43 during the conduction time $t_4$ will be sufficient to effect the generation of a sufficiently great voltage surge, when the current flow through primary winding 42 is interrupted.

Figure 3:
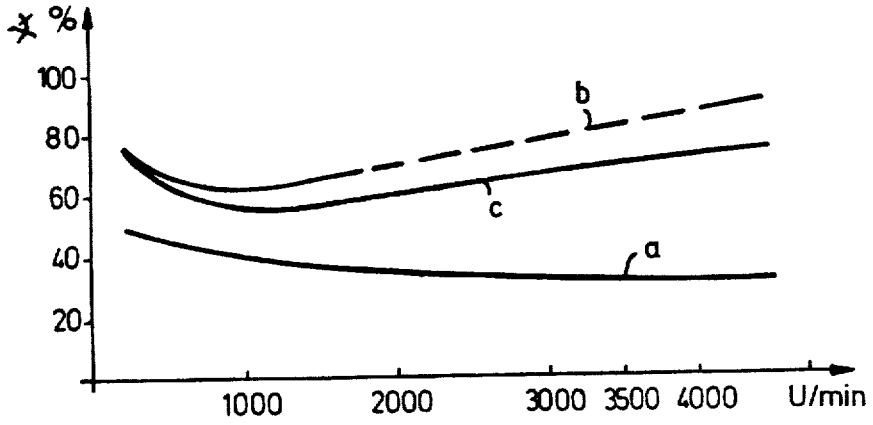
FIG. 3 depicts in graphical form the relationship between the conduction angle of the primary winding of the ignition transformer and engine speed.

FIG. 3 depicts graphically the dependence upon speed of the fraction of the ignition cycle, expressed in percent, during which current flows through primary winding 42. Curve a shows the speed dependency of the percentage conduction time of current flow through primary winding 42 which would prevail if the output voltage appearing at output B of Schmitt trigger 15 were employed to directly control the conduction and non-conduction times of the electronic switch 41. It will be noted that if an attempt were made to use such voltage directly, the percentage conduction time would decrease with increasing engine speed, which is undesirable as explained before.

The curve b shows the percentage conduction time of current flow through primary winding 42, in the illustrated embodiment, but with capacitor 32 removed from the circuit it will be noted that in the speed range between about 1000 and 2000 rpm the percentage conduction time increases. It will also be noted that above an engine speed of about 2000 rpm the arrangement ceases to be dependably operable, as indicated by the broken line. This is for the reason explained earlier, namely, that at higher engine speeds, the duration of charging time interval $t_2$ is too short to permit capacitor 31 to charge up to a value sufficient to dependably reverse-bias the base-emitter junction of transistor 28, at the end of charging period $t_2$.

Curve c depicts the performance of the illustrated embodiment, with both capacitors 31 and 32 included. In the speed range above 1000 rpm the percentage conduction time increase steadily with increasing engine speed. Provision of capacitor 32 affords the additional advantage, in this embodiment, that the percentage conduction time does not much exceed the maximum desirable value of 70%. Percentage conduction times above this valve may be disadvantageous, because when the current flow through primary 42 is interrupted under such circumstances, sufficient time may not remain within the ignition period for the complete development of the ignition spark. In the illustrated embodiment, if the engine speed reaches very high values, and the number of ignitions per minute reaches a value in excess of about 28,000, then the percentage conduction time will undesirably exceed the maximum permissible value of 70%.

Figure 4:
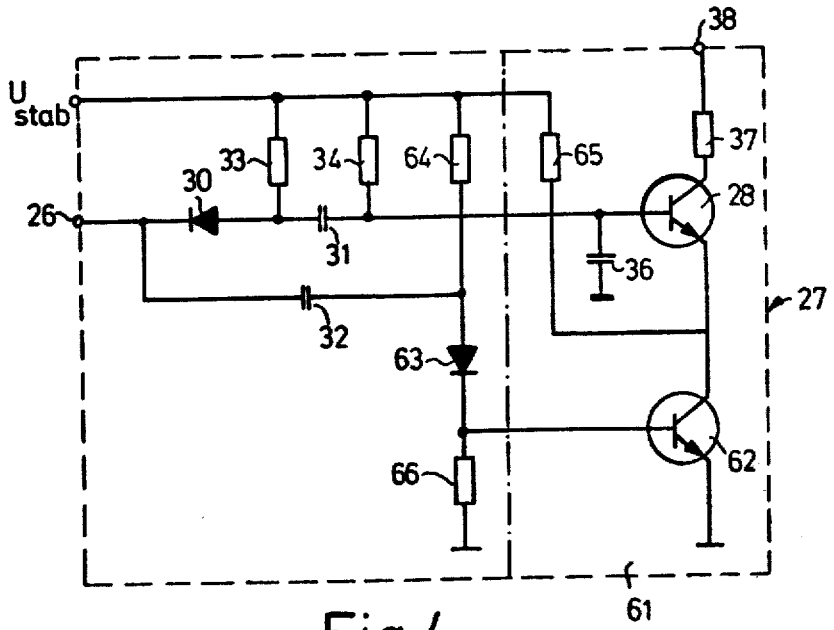
FIG. 4 depicts a circuit which can be employed in place of a portion of the circuit shown in FIG. 1.

In order to avoid this added disadvantage, the control stage 27 of FIG. 1 can be replaced by the control stage 27 shown in FIG. 4. In this embodiment, instead of a single control transistor 28 having a single control input (base), use is made of two transistors 28 and 62, having their collector-emitter paths connected in series and providing two control inputs (bases). Transistors 28 and 62 together form an AND-gate, inasmuch as electronic switch 41 (FIG. 1) can become conductive only if both of transistors 28, 62 (FIG. 4) are rendered conductive by appropriate forward-biasing input signals at their bases. In FIG. 4, as in FIG. 1 the right-hand terminal of capacitor 31 is connected to the base of transistor 28. However, the right-hand terminal of additional capacitor 32 is in FIG. 4 connected to the base of additional transistor 62, via a diode 63. The collector of transistor 62 is connected via a resistor 65 to the circuit junction 7 maintained at a stabilized voltage of 6.8. volts. The anode of diode 63 is likewise connected to the stabilized-voltage circuit junction 7.

With the arrangement of FIG. 4, when the engine speed exceeds a predetermined value, a limit is placed upon the conduction angle by rendering transistor 62 non-conductive after a predetermined time. The predetermined time is dependent upon the capacitance of the capacitor 32 and the resistance of resistor 64.

It will be appreciated that in FIG. 1 the Schmitt trigger 15 and the control stage 27 together constitute a monostable control circuit having timing capacitors 31 and 32. When the negative half-cycle of voltage waveform A reaches the value $U_2$, the monostable control circuit 15, 27 is triggered into its unstable state, and charged timing capacitors 31, 32 discharge, with the duration of the discharge of such capacitors determining the duration of the unstable state of the monostable control circuit 15, 27. When the monostable control circuit 15, 27 subsequently reverts to its stable state, the timing capacitors 31, 32 do not immediately charge up again, but are charged up in a controlled manner during the time period $t_2$.

It will be understood that each of the elements described above, or two or more together, may also find a useful application in other types of circuits and constructions differing from the types described above.

While the invention has been illustrated and described as embodied in an ignition system operating in dependence upon engine speed, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In the ignition system of an internal combustion engine comprised of at least one electrical igniting element operative for producing an ignition spark once per ignition cycle, in combination, an ignition transformer having a secondary winding connected across said igniting element and having a primary winding; means for establishing a flow of current through said primary winding and including electronic switch means in the current path of said primary winding operative for controlling the flow of current through said primary winding; crankshaft-synchronized triggering means operative for generating a train of crankshaft-synchronized triggering pulses; monostable control means connected to said electronic switch means and having a trigger input connected to said triggering means for receipt of said triggering pulses, and operative when triggered into the unstable state thereof for rendering and maintaining said switch means non-conductive for the duration of said unstable state, whereby to interrupt the flow of current through said primary winding and induce across said secondary winding a voltage surge causing said igniting element of produce an ignition spark, and operative upon reverting to the stable state thereof for rendering and maintaining said switch means conductive for the duration of said stable state, whereby to establish a build-up of current flow in said primary winding in preparation for the next interruption of current flow, said monostable control means including timing means operative with increasing engine speed within a predetermined range of engine speeds for automatically and progressively [increasing] *decreasing* the ratio of the duration of said unstable state to the duration of said ignition cycle, and wherein said timing means comprises energy-storing means, means for effecting a first change of stored energy of said energy-storing means during the intervals between said triggering pulses and thereby for time periods dependent upon engine speed, and means operative upon generation of a triggering pulse by said triggering means for causing said monostable control means to undergo a transition to said unstable state and initiating an opposite second change of stored energy of said energy-storing means and maintaining said monostable control means in said unstable state [until the completion of] *during* said second change of stored energy.

2. The system defined in claim 1, wherein said triggering means comprises A.C. generator means operative for generating an A.C. voltage having a frequency proportional to engine speed and comprised of voltage half-cycles, of first and second polarity and threshold-detecting means operative for generating a triggering [signal] *pulse* for said monostable control means when a voltage half-cycle of said first polarity reaches a predetermined value.

3. The system defined in claim 1, wherein said triggering means comprises A.C. generator means operative for generating an A.C. voltage having a frequency proportional to engine speed and comprised of voltage half-cycles of first and second polarity, and threshold detecting means operative for generating the leading edge of a triggering pulse for said monostable control means when a voltage half-cycle of said first polarity reaches a first predetermined value and operative for generating the trailing edge of such triggering pulse when the same voltage half-cycle subsequently reaches a second predetermined value.

4. The system defined in claim 3, said A.C. generator means comprising means operative for generating an A.C. voltage comprised of voltage half-cycles of first and second polarity having such respective durations that the ratio of the duration of the voltage half-cycles of said first polarity to the duration of the voltage half-cycles of said second polarity decreases with increasing engine speed within said predetermined range of engine speeds.

5. An ignition system for an internal combustion engine, comprising in combination, a spark-producing element operative for producing an ignition spark once per ignition cycle; an ignition transformer including a secondary winding connected in circuit with said element and further including a primary winding; a controllable electronic switch connected in circuit with said primary winding and operative when conductive and non-conductive for respectively permitting and preventing the flow of current through said primary winding, said controllable electronic switch having a control input; a control transistor having a collector connected to said control input for controlling the conductivity of said switch in dependence upon the voltage of said collector, said control transistor being comprised of a control current path for the flow of control current for controlling the conductivity of said control transistor and the voltage at said collector thereof; a signal generator operative for generating an A.C. control voltage having a frequency proportional to engine speed; a threshold circuit connected to said signal generator and having [said] first and second circuit states which said threshold circuit assumes when said control voltage is of one and the opposite polarity, respectively; and energy storing means connected to said threshold circuit and to said control current path of said control transistor so as to be alternately energized through said control path and then deenergized through said threshold circuit when the latter is in said second circuit state, with the amount of energy stored by said energy storing means decreasing with increasing engine speed for automatically and progressively decreasing the duration of the [conduction] *non-conduction* time of said control transistor while increasing the fraction of the ignition cycle during which said control transistor conducts, the start of the deenergizing of said energy storing means [through] *causing via* said control current path [causing] said controllable electronic switch to become non-conductive, and said controllable electronic switch becoming conductive again when the amount of energy stored by said energy storing means reaches a predetermined value during said deenergizing thereof.

6. A system as defined in claim 5, wherein said energy storing means is capacitive, and wherein the energizing and deenergizing of said energy storing means occurs in the form of charging and discharging of said energy storing means.

7. In the ignition system of an internal combustion engine comprised of at least one engine cylinder, means for introducing a combustion mixture into the cylinder, and an electrical igniting element operative for igniting the combustion mixture in the cylinder once per ignition cycle, in combustion, an ignition transformer having a secondary winding connected across said igniting element and having a primary winding means for establishing a flow of current through said primary winding and including electronic switch means in the current path of said primary winding operative for controlling the flow of current through said primary winding; crankshaft-synchronized triggering means operative for generating a train of crankshaft-synchronized triggering pulses each having a crankshaft-synchronized leading edge and each having a duration dependent upon engine speed; monostable control means connected to said electronic switch means and having a trigger input connected to said triggering means for receipt of said triggering signals, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish a build-up of current flow in said primary winding in preparation for the next interruption of current flow, said monostable control means including timing means operative for automatically [increasing] *decreasing* the ratio of the duration of said ignition cycle to the duration of said stable state with increasing engine speed within a predetermined range of engine speeds, wherein said timing means comprises first energy-storing capacitor means and second energy-storing means, means for charging said first capacitor means at a first charging rate and said second capacitor means at a higher second charging rate during the intervals between said triggering pulses and thereby for time periods dependent upon engine speed, and means operative upon generation of the leading edge of a triggering pulse by said triggering means for causing said monostable control means to undergo a transition to said unstable state if at least one of said capacitor means is charged to a respective predetermined voltage and operative for discharging said first and second capacitor means and operative for maintaining said monostable control means in said unstable state until both said first and second capacitor means are discharged to predetermined respective extents, whereby if the duration of the time intervals between triggering pulses at high engine speeds is too short to permit said first capacitor means to charge up to the respective predetermined voltage then at least said second capacitor means will charge up to the respective predetermined voltage in order to insure that said monostable control means will be triggered into its unstable state upon generation of the leading edge of a triggering pulse by said triggering means.

8. The system defined in claim 7, wherein said first energy-storing means and said second energy-storing means are together comprised of a first capacitor and a diode connected in series therewith and a second capacitor connected in parallel with the series combination of said first capacitor and diode.

9. The system defined in claim 8, wherein the capacitance of said second capacitor is approximately one hundred times the capacitance of said first capacitor.

10. In the ignition system of an internal combustion engine comprised of at least one engine cylinder, means for introducing a combustion mixture into the cylinder, and an electrical igniting element operative for igniting the combustion mixture in the cylinder, once per ignition cycle, in combination, an ignition transformer having a secondary winding connected across said igniting element and having a primary winding means for establishing a flow of current through said primary winding and including electronic switch means in the current path of said primary winding operative for controlling the flow of current through said primary winding; crankshaft-synchronized triggering means operative for penetrating a train of crankshaft-synchronized triggering signals; monostable control means connected to said electronic switch means and having a trigger input connected to said triggering means for receipt of said triggering signals, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish build-up of current flow in said primary winding in preparation for the next interruption of current flow, said monostable control means including timing means operative for automatically [increasing] *decreasing* the ratio of the duration of said unstable state to the duration of said ignition cycle with increasing engine speed within a predetermined range of engine speeds, wherein said triggering means comprises A.C. generator means operative for generating an A.C. voltage having a frequency proportional to engine speed and comprised of voltage half-cycles, of first and second polarity and threshold-detecting means operative for generating a triggering signal for said monostable control means when a voltage half-cycle of said first polarity reaches a predetermined value, wherein said monostable control means comprises a source of stabilized voltage having two terminals, a first capacitor and a diode connected in series, a second capacitor connected in parallel with the series combination of said first capacitor and said diode, a resistor connecting one terminal of said source to the junction between one terminal of said diode and one terminal of said first capacitor, a resistor connecting said one terminal of said source to the other terminal of said first capacitor, and an electronic switch element so connected to said electronic switch means as to control the conductivity of the latter and comprising a control electrode connected to said other terminal of said first capacitor, and said other terminal of said diode being connected to the output of said threshold-detecting means.

11. In the ignition system of an internal combustion engine comprised of at least one engine cylinder, means for introducing a combustion mixture into the cylinder, and an electrical igniting element operative for igniting the combustion mixture in the cylinder once per ignition cycle, in combination, an ignition transformer having a secondary winding connected across said igniting element and having a primary winding means for establishing a flow of current through said primary winding and including electronic switch means in the current path of said primary winding operative for controlling the flow of current through said primary winding; crankshaft-synchronized triggering means operative for generating a train of crankshaft-synchronized triggering signals; monostable control means connected to said electronic switch means and having a trigger input connected to said triggering means for receipt of said triggering signals, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish a build-up of current flow in said primary winding in preparation for the next interruption of current flow, said monostable control means including timing means operative for automatically [increasing] *decreasing* the ratio of the duration of said unstable state to the duration of said ignition cycle, with increasing engine speed within a predetermined range of engine speeds, wherein said triggering means comprises A.C. generator means operative for generating an A.C. voltage having a frequency proportional to engine speed and comprised of voltage half-cycles, of first and second polarity and threshold-detecting means operative for generating a triggering signal for said monostable control means when a voltage half-cycle of said first polarity reaches a predetermined value, wherein said monostable control means comprises a source of stabilized voltage having two terminals, a first capacitor and a diode connected in series with each other, a resistor connecting one terminal of said source to the junction between one terminal of said diode and one terminal of said first capacitor, an AND-gate so connected to said electronic switch means as to control the conductivity of the latter and having a first input connected to said other terminal of said first capacitor and having a second input, and a second capacitor having one terminal connected to the other terminal of said diode and having another terminal connected to said second input of said AND-gate, said other terminal of said diode being connected to the output of said threshold-detecting means.

12. The system defined in claim 11, wherein said AND-gate is comprised of two electronic switch elements having current paths connected in series with each other and being so connected to said electronic switch means as to render the latter conductive when both said two electronic switch elements are conductive, with each of said two electronic switch elements having a control electrode constituting a respective one of said two inputs of said AND-gate.

13. The system defined in claim 12, wherein said two electronic switch elements are both transistors each having a base constituting the respective control electrode and an emitter and a collector, the base of the first of said transistor being connected to said other terminal of said first capacitor and the base of the second transistor being connected to said other terminal of said second capacitor via a diode, the collector of said second transistor being connected to the emitter of said first transistor and being furthermore connected via a resistor to said one terminal of said source of stabilized voltage, and further including a resistor connecting said other terminal of said second capacitor to said one terminal of said source.

*14. An ignition system for an internal combustion engine, comprising in combination, a spark-producing element operative for producing an ignition spark once per ignition cycle; an ignition transformer including a secondary winding connected in circuit with said element and further including a primary winding; a controllable electronic switch connected in circuit with said primary winding and operative when conductive and non-conductive for respectively permitting and preventing the flow of current through said primary winding, said controllable electronic switch having a control input; a control transistor having a collector connected to said control input for controlling the conductivity of said switch in dependence upon the voltage of said collector, said control transistor being comprised of a control current path for the flow of control current for controlling the conductivity of said control transistor and the voltage at said collector thereof; a signal generator operative for generating an A.C. control voltage having a frequency proportional to engine speed; a threshold circuit connected to said signal generator and having first and second circuit states which said threshold circuit assumes when said control voltage is of one and the opposite polar-*

*ity, respectively; and energy storing means connected to said threshold circuit and to said control current path of said control transistor and forming with said threshold circuit a monostable control means, said energy storing means being alternately energized through said control path and then deenergized through said threshold circuit when the latter is in said second circuit state, with the amount of energy stored by said energy storing means decreasing with increasing engine speed, the start of the deenergizing of said energy storing means causing via said control current path said controllable electronic switch to become non-conductive, and said controllable electronic switch becoming conductive again when the amount of energy stored by said energy storing means reaches a predetermined value during the deenergizing thereof.*

*15. In the ignition system of an internal combustion engine comprised of at least one electrical igniting element operative for producing an ignition spark once per ignition cycle, in combination, an ignition transformer having a secondary winding connected across said igniting element and having a primary winding; means for establishing a flow of current through said primary winding and including electronic switch means in the current path of said primary winding operative for controlling the flow of current through said primary winding; crankshaft-synchronized triggering means operative for generating a train of crankshaft-synchronized triggering pulses; monostable control means connected to said electronic switch means and having a trigger input connected to said triggering means for receipt of said triggering pulses, and operative when triggered into the unstable state thereof for rendering and maintaining said switch means non-conductive for the duration of said unstable state, whereby to interrupt the flow of current through said primary winding and induce across said secondary winding a voltage surge causing said igniting element to produce an ignition spark, and operative upon reverting to the stable state thereof for rendering and maintaining said switch means conductive for the duration of said stable state, whereby to establish a build-up of current flow in said primary winding in preparation for the next interruption of current flow, said monostable control means including timing means operative with increasing engine speed for automatically and progressively controlling the duration of said unstable state in such a manner that the time interval during the ignition cycle for which said electronic switch means is conductive will be sufficiently long for effecting predetermined current build-up in said primary winding irrespective of the increasing engine speed, and wherein timing means comprises energy-storing means, means for effecting a first change of stored energy of said energy-storing means during the intervals between said triggering pulses and thereby for time periods dependent upon engine speed, and means operative upon generation of a triggering pulse by said triggering means for causing said monostable control means to undergo a transition to said unstable state and initiating an opposite second change of stored energy of said energy-storing means and maintaining said monostable control means in said unstable state during said second change of stored energy.*

*16. The system defined in claim 15, wherein said triggering means comprises A.C. generator operative for generating an A.C. voltage having a frequency proportional to engine speed and comprised of voltage half-cycles, of first and second polarity and threshold-detecting means operative for generating a triggering pulse for said monostable control means when a voltage half-cycle of said first polarity reaches a predetermined value.*

*17. The system defined in claim 15, wherein said triggering means comprises A.C. generator means operative for generating an A.C. voltage having a frequency proportional to engine speed and comprised of voltage half-cycles of first and second polarity, and threshold-detecting means operative for generating the leading edge of a triggering pulse for said monostable control means when a voltge half-cycle of said first polarity reaches a first predetermined value and operative for generating the trailing edge of such triggering pulse when the same voltage half-cycle subsequently reaches a second predetermined value.*

*18. The system defined in claim 17, said A.C. generator means comprising means operative for generating an A.C. voltage comprised of voltage half-cycles of first and second polarity having such respective durations that the ratio of the duration of the voltage half-cycles of said first polarity to the duration of the voltage half-cycles of said second polarity decreases with increasing engine speed within said predetermined range of engine speeds.*

*19. An ignition system for an internal combustion engine, comprising in combination, a spark-producing element operative for producing an ignition spark once per ignition cycle; an ignition transformer including a secondary winding connected in circuit with said element and further including a primary winding; a controllable electronic switch connected in circuit with said primary winding and operative when conductive and non-conductive for respectively permitting and preventing the flow of current through said primary winding, said controllable electronic switch having a control input; a control transistor having a collector connected to said control input for controlling the conductivity of said switch in dependence upon the voltage at said collector, said control transistor being comprised of a control current path for the flow of control current for controlling the conductivity of said control transistor and the voltage at said collector thereof; a signal generator operative for generating an A.C. control voltage having a frequency proportional to engine speed; a threshold circuit connected to said signal generator and having first and second circuit states which said threshold circuit assumes when said control voltage is of one and the opposite polarity, respectively; and energy storing mens connected to said threshold circuit and to said control current path of said control transistor so as to be alternately energized through said control path and then deenergized through said threshold circuit when the latter is in said second circuit state, with the amount of energy stored by said energy storing means decreasing with increasing engine speed for automatically and progressively controlling the duration of the conduction time of said control transistor in such a manner that the time interval during the ignition cycle for which said controllable electronic switch is conductive will be sufficiently long for effecting predetermined current build-up in said primary winding irrespective of increasing engine speed, the start of the deenergizing of said energy storing means causing via said control current path said controllable electronic switch to become non-conductive, and said controllable electronic switch becoming conductive again when the amount of energy stored by said energy storing means reaches a predetermined value during the deenergizing thereof.*

*20. A system as defined in claim 19, wherein said energy storing means is capacitive, and wherein the energizing and deenergizing of said energy storing means occurs in the form of charging and discharging of said energy storing means.*

*21. In the ignition system of an internal combustion engine comprised of at least one engine cylinder, means for*

*introducing a combustion mixture into the cylinder, and an electrical igniting element operative for igniting the combustion mixture in the cylinder once per ignition cycle, in combination, an ignition transformer having a secondary winding connected across said igniting element and having a primary winding means for establishing a flow of current through said primary winding and including electronic switch means in the current path of said primary winding operative for controlling the flow of current through said primary winding; crankshaft-synchronized triggering means operative for generating a train of crankshaft-synchronized triggering pulses each having a crankshaft-synchronized leading edge and each having a duration dependent upon engine speed; monostable control means connected to said electronic switch means and having a trigger input connected to said triggering means for receipt of said triggering pulses, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish a build-up of current flow in said primary winding in preparation for the next interruption of current flow, said monostable control means including means operative with increasing engine speed for automatically and progressively controlling the duration of said unstable state in such a manner that the time interval during the ignition cycle for which said electronic switch means is conductive will be sufficiently long for effecting predetermined current build-up in said primary winding irrespective of increasing engine speed, wherein said timing means comprises first energy-storing capacitor means and second energy-storing means, means for charging said first capacitor means at a first charging rate and said second capacitor means at a higher second charging rate during the intervals between said triggering pulses and thereby for time periods dependent upon engine speed, and means operative upon generation of the leading edge of a triggering pulse by said triggering means for causing said monostable control means to undergo a transition to said unstable state if at least one of said capacitor means is charged to a respective predetermined voltage and operative for discharging said first and second capacitor means and operative for maintaining said monostable control means in said unstable state until both said first and second capacitor means are discharged to predetermined respective extents, whereby if the duration of the time intervals between triggering pulses at high engine speeds is too short to permit said first capacitor means to charge up to the respective predetermined voltage then at least said second capacitor means will charge up to the respective predetermined voltage in order to insure that said monostable control means will be triggered into its unstable state upon generation of the leading edge of a triggering pulse by said triggering means.*

*22. The system defined in claim 21, wherein said first energy-storing means and said second energy-storing means are together comprised of a first capacitor and a diode connected in series therewith and a second capacitor connected in parallel with the series combination of said first capacitor and said diode.*

*23. The system defined in claim 22, wherein the capacitance of said second capacitor is approximately one hundred times the capacitance of said first capacitor.*

*24. In the ignition system of an internal combustion engine comprised of at least one engine cylinder, means for introducing a combustion mixture into the cylinder, and an electrical igniting element operative for igniting the combustion mixture in the cylinder, once per ignition cycle, in combination, an ignition transformer having a secondary winding connected across said igniting element and having a primary winding means for establishing a flow of current through said primary winding and including electronic switch means in the current path of said primary winding operative for controlling the flow of current through said primary winding; crankshaft-synchronized triggering means operative for penetrating a train of crankshaft-synchronized triggering signals; monostable control means connected to said electronic switch means and having a trigger input connected to said triggering means for receipt of said triggering signals, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish build-up of current flow in said primary winding in preparation for the next interruption of current flow, said monostable control means including timing means operative with increasing engine speed for automatically and progressively controlling the duration of said unstable state in such a manner that the time interval during the ignition cycle for which said electronic switch means is conductive will be sufficiently long for effecting predetermined current build-up in said primary winding irrespective of increasing engine speed, wherein said triggering means comprises A.C. generator means operative for generating an A.C. voltage having a frequency proportional to engine speed and comprised of voltage half-cycles, of first and second polarity and threshold-detecting means operative for generating a triggering signal for said monostable control means when a voltage half-cycle of said first polarity reaches a predetermined value, wherein said monostable control means comprises a source of stabilized voltage having two terminals, a first capacitor and a diode connected in series, a second capacitor connected in parallel with the series combination of said first capacitor and said diode, a resistor connecting one terminal of said source to the junction between one terminal of said diode and one terminal of said first capacitor, a resistor connecting said one terminal of said source to the other terminal of said first capacitor, and an electronic switch element so connected to said electronic switch means as to control the conductivity of the latter and comprising a control electrode connected to said other terminal of said first capacitor, and said other terminal of said diode being connected to the output of said threshold-detecting means.*

*25. In the ignition system of an internal combustion engine comprised of at least one engine cylinder, means for introducing a combustion mixture into the cylinder, and an electrical igniting element operative for igniting the combustion mixture in the cylinder once per ignition cycle, in combination, an ignition transformer having a secondary winding connected across said igniting element and having a primary winding means for establishing a flow of current through said primary winding and including electronic switch means in the current path of said primary winding operative for controlling the flow of current*

*through said primary winding; crankshaft-synchronized triggering means operative for generating a train of crankshaft-synchronized triggering signals; monostable control means connected to said electronic switch means and having a trigger input connected to said triggering means for receipt of said triggering signals, and operative when triggered into the unstable state thereof for rendering and maintaining said switch means non-conductive for the duration of said unstable state, whereby to interrupt the flow of current through said primary winding and induce across said secondary winding a voltage surge causing said igniting element to ignite said combustion mixture, and operative upon reverting to the stable state thereof for rendering and maintaining said switch means conductive for the duration of said stable state, whereby to establish a build-up of current flow in said primary winding in preparation for the next interruption of current flow, said monostable control means including timing means operative with increasing engine speed for automatically and progressively controlling the duration of said unstable state in such a manner that the time interval during the ignition cycle for which said electronic switch means is conductive will be sufficiently long for effecting predetermined current build-up in said primary winding irrespective of increasing engine speed, wherein said triggering means comprises A.C. generator means operative for generating an A.C. voltage having a frequency proportional to engine speed and comprised of voltage half-cycles, of first and second polarity and threshold-detecting means operative for generating a triggering signal for said monostable control means when a voltage half-cycle of said first polarity reaches a predetermined value, wherein said monostable control means comprises a source of stabilized voltage having two terminals, a first capacitor and a diode connected in series with each other, a resistor connecting one terminal of said source to the junction between one terminal of said diode and one terminal of said first capacitor, a resistor connecting said one terminal of said source to the other terminal of said first capacitor, an AND-gate so connected to said electronic switch means as to control the conductivity of the latter and having a first input connected to said other terminal of said first capacitor and having a second input, and a second capacitor having one terminal connected to the other terminal of said diode and having another terminal connected to said second input of said AND-gate, said other terminal of said diode being connected to the output of said threshold-detecting means.*

*26. The system defined in claim 25, wherein said AND-gate is comprised of two electronic switch elements having current paths connected in series with each other and being so connected to said electronic switch means as to render the latter conductive when both said two electronic switch elements are conductive, with each of said two electronic switch elements having a control electrode constituting a respective one of said two inputs of said AND-gate.*

*27. The system defined in claim 26, wherein said two electronic switch elements are both transistors each having a base constituting the respective control electrode and an emitter and a collector, the base of the first of said transistor being connected to said other terminal of said first capacitor and the base of the second transistor being connected to said other terminal of said second capacitor via a diode, the collector of said second transistor being connected to the emitter of said first transistor and being furthermore connected via a resistor to said one terminal of said source of stabilized voltage, and further including a resistor connecting said other terminal of said second capacitor to said one terminal of said source.*

*28. In the ignition system of an internal combustion engine comprised of at least one electrical igniting element operative for producing an ignition spark once per ignition cycle, in combination,*

*an ignition transformer having a secondary winding connected across said igniting element and having a primary winding;*

*a threshold circuit having a control-signal input and a triggering-signal output and assuming either a first state or a second state in dependence upon the control signals received at said control-signal input;*

*crankshaft-synchronized control-signal-generating means operative for applying to said control-signal input of said threshold circuit control signals causing said threshold circuit to alternately assume said first and second states for respective first-state and second-state time intervals t1 and t2, where t1 + t2 equals the duration of one ignition cycle, the ratio t2/(t1 + t2) undesirably decreasing with increasing engine speed within a predetermined range of engine speeds;*

*monostable control means having a trigger input connected to said trigger-signal output of said threshold circuit and triggered into the unstable state thereof in response to assumption of said first state by said threshold circuit and subsequently reverting into the stable state thereof, the unstable-state and stable-state durations of said monostable control means being equal to t3 and t4, respectively, where t3 + t4 equals the duration of one ignition cycle;*

*electronic switch means in the current path of said primary winding operative for controlling the flow of current through said primary winding,*

*said electronic switching means being connected to said monostable control means and being rendered non-conductive when said monostable control means is triggered into said unstable state and remaining non-conductive for the duration of said unstable state,*

*whereby to interrupt the flow of current through said primary winding and induce across said secondary winding a voltage surge causing said igniting element to produce an ignition spark,*

*said electronic switch means being rendered conductive when said monostable control means reverts into said stable state and remaining conductive for the duration of said stable state,*

*whereby to establish a build-up of current flow in said primary winding in preparation for the next interruption of current flow,*

*said monostable control means including timing means operative with increasing engine speed within said predetermined range of engine speeds for automatically and progressively decreasing the duration of said unstable state while simultaneously causing the ratio t4/(t3 + t4) plotted with respect to engine speed to have within said predetermined speed range a slope which is more positive than the ratio t2/(t1 + t2) plotted with respect to engine speed within said predetermined speed range,*

*said monostable control means including a control transistor having a control current path,*

*said timing means being energy-storing timing means connected to said control current path of said control transistor and to said threshold circuit for alternating energization of said energy-storing timing means through said control current path of said control transistor and deenergization of said energy-storing timing means through said threshold circuit.*

* * * * *